United States Patent
Shenoy et al.

(10) Patent No.: US 9,632,586 B2
(45) Date of Patent: Apr. 25, 2017

(54) AUDIO DRIVER USER INTERFACE

(71) Applicant: Nokia Technologies Oy, Espoo (FI)

(72) Inventors: Ravi Shenoy, Bangalore (IN); Erika Reponen, Tampere (FI); Mikko Tammi, Tampere (FI); Anssi Rämö, Tampere (FI)

(73) Assignee: Nokia Technologies Oy, Espoo (FI)

( * ) Notice: Subject to any disclaimer, the term of this patent is extended or adjusted under 35 U.S.C. 154(b) by 354 days.

(21) Appl. No.: 14/361,401

(22) PCT Filed: Nov. 21, 2012

(86) PCT No.: PCT/FI2012/051150
§ 371 (c)(1),
(2) Date: May 29, 2014

(87) PCT Pub. No.: WO2013/079782
PCT Pub. Date: Jun. 6, 2013

(65) Prior Publication Data
US 2014/0258864 A1    Sep. 11, 2014

(30) Foreign Application Priority Data
Nov. 30, 2011    (IN) .......................... 4156/CHE/2011

(51) Int. Cl.
*G06F 3/01*    (2006.01)
*G06F 3/043*   (2006.01)
*G06F 3/0485*  (2013.01)
*G10L 25/48*   (2013.01)

(52) U.S. Cl.
CPC .............. *G06F 3/017* (2013.01); *G06F 3/043* (2013.01); *G06F 3/0485* (2013.01); *G10L 25/48* (2013.01)

(58) Field of Classification Search
CPC ........ G06F 3/043; G06F 3/017; G06F 3/0485; G10L 25/48
USPC ............ 381/92; 704/275; 715/716, 727, 728
See application file for complete search history.

(56) References Cited

U.S. PATENT DOCUMENTS

| 4,654,648 A | 3/1987 | Herrington et al. |
| 2008/0047763 A1 | 2/2008 | Le |
| 2008/0252595 A1* | 10/2008 | Boillot .................... G06F 3/011 345/156 |
| 2011/0096036 A1 | 4/2011 | McIntosh et al. |

FOREIGN PATENT DOCUMENTS

| WO | 2008047294 A2 | 4/2008 |
| WO | 2012058465 A2 | 5/2012 |

OTHER PUBLICATIONS

International Search Report received for corresponding Patent Cooperation Treaty Application No. PCT/FI2012/051150, dated Mar. 13, 2013, 5 pages.

* cited by examiner

*Primary Examiner* — David Ton
(74) *Attorney, Agent, or Firm* — Harrington & Smith

(57) ABSTRACT

A method for an audio driver user interface comprising: capturing at least two audio signals (1 1, 14, 101); determining a trajectory of an audio source from the at least two audio signals (103); and generating a user interface input dependent on the trajectory of the audio source (105).

17 Claims, 12 Drawing Sheets

AUDIO DRIVER USER INTERFACE

RELATED APPLICATION

This application was originally filed as PCT Application No. PCT/FI2012/051150 filed on Nov. 21, 2012, which claims priority to IN application 4156/CHE/2011 filed on Nov. 30, 2011.

FIELD OF THE APPLICATION

The present application relates to apparatus for the processing of audio signals for user interface inputs. The application further relates to, but is not limited to, portable or mobile apparatus for processing audio signals for user interface purposes.

BACKGROUND OF THE APPLICATION

Modern electronic equipment is designed for ease of use such that the user interface between the man and machine is designed to enable the user to operate the apparatus easily and without undue effort. Typically modern day devices are equipped with touchscreen or touch interfaces enabling the user to perform user inputs in a more natural environment than provided for using conventional keyboard and pointing device combinations. The touch interface enables such inputs as "swipe" and "scroll" user input. The "scroll" and "swipe" user inputs in such devices as well as being implemented by touch interfaces or physical buttons has also been implemented using eye tracking algorithms to track the movement of the user's eyes.

The "swipe" is an important part of any modern user interface. A "swipe" can be associated with a waking up of the apparatus and a "scroll" user input moving a page up and down where it is unable to display the complete page on the screen at any one time. The "swipe away" user input is one of the primary waves of browsing within a scene. Furthermore scrolling and horizontal and/or vertical scrolling is also an important part of modern user interfaces, particularly within browsers, document readers and PDF readers.

SUMMARY OF THE APPLICATION

Aspects of this application thus provide an audio based user interface whereby audio signals such as those produced by the user can be used as a user interface input such as for example a "swipe" or "scroll" input.

There is provided a method comprising: determining at least two audio signals; determining a trajectory of an audio source from the at least two audio signals; and generating a user interface input dependent on the trajectory of the audio source.

Generating a user input dependent on the trajectory of the audio source may comprise: matching the trajectory of the audio source with at least one defined gesture trajectory; and generating the user interface input dependent on the at least one defined gesture trajectory.

Matching the trajectory of the audio source may comprise at least one of: detecting the speed of the trajectory of the audio source is within a defined gesture speed range; and detecting the direction of the trajectory of the audio source is within a defined gesture direction range.

Determining a trajectory of an audio source from the at least two audio signals may comprise: determining an audio source position dependent on the at least two audio signals for a first time and a succeeding second time; and determining the trajectory of the audio source from the difference in audio source position for the first time and the succeeding second time.

Determining an audio source position dependent on the at least two audio signals may comprise determining a delay maximising the correlation between the at least two audio signals.

Determining a trajectory of an audio source from the at least two audio signals may comprise determining a trajectory of an audio source in at least one of: determining a trajectory in one dimension based on at least two audio signals; and determining a trajectory in two or three dimensions based on at least three audio signals.

Determining a delay maximising the correlation between the at least two audio signals may comprise: framing the at least two audio signals; time to frequency domain converting the at least two audio signals frame; filtering the at least two audio signal frames in the frequency domain to form sub-bands; cross-correlating for at least two audio signals frame frequency domain sub-band values for a range of delay values; and selecting the delay maximising the cross-correlation product for the at least two audio signals frame frequency domain sub-band values.

Generating a user interface input dependent on the trajectory of the audio source may comprise at least one of: generating a 'swipe' dependent on the trajectory of the audio source; and generating a 'scroll' dependent on the trajectory of the audio source.

Generating a user interface input dependent on the trajectory of the audio source may comprise: detecting a status of an apparatus and generating the user interface input further dependent on status of the apparatus.

The method may comprise determining at least one further parameter associated with the audio source and generating a user interface input dependent on the trajectory of the audio source may comprise generating a user interface input further dependent on the at least one further parameter associated with the audio source.

The at least one parameter associated with the audio source may comprise at least one of: tone of the audio source; dominant frequency of the audio source; frequency range of the audio source; duration of the audio source; volume of the audio source; amplitude of the audio source; pitch of the audio source; and total power of the audio source.

Matching the trajectory of the audio source with at least one defined gesture trajectory may comprise matching a first part of the trajectory of the audio source with a first defined gesture trajectory and matching a second part of the trajectory of the audio source with a second defined gesture trajectory.

Determining at least two audio signals may comprise capturing at least one acoustic signal by a first microphone to determine a first of the at least two audio signals and capturing at least one acoustic signal by a second microphone to determine a second of the at least two audio signals.

An apparatus comprising at least one processor and at least one memory including computer code for one or more programs, the at least one memory and the computer code configured to with the at least one processor cause the apparatus to at least perform: determining at least two audio signals; determining a trajectory of an audio source from the at least two audio signals; and generating a user interface input dependent on the trajectory of the audio source.

Generating a user input dependent on the trajectory of the audio source may cause the apparatus to perform: matching the trajectory of the audio source with at least one defined gesture trajectory; and generating the user interface input dependent on the at least one defined gesture trajectory.

Matching the trajectory of the audio source may cause the apparatus to perform at least one of: detecting the speed of the trajectory of the audio source is within a defined gesture speed range; and detecting the direction of the trajectory of the audio source is within a defined gesture direction range.

Determining a trajectory of an audio source from the at least two audio signals may cause the apparatus to perform: determining an audio source position dependent on the at least two audio signals for a first time and a succeeding second time; and determining the trajectory of the audio source from the difference in audio source position for the first time and the succeeding second time.

Determining an audio source position dependent on the at least two audio signals may cause the apparatus to perform determining a delay maximising the correlation between the at least two audio signals.

Determining a trajectory of an audio source from the at least two audio signals may cause the apparatus to perform determining a trajectory of an audio source in at least one of: determining a trajectory in one dimension based on at least two audio signals; and determining a trajectory in two or three dimensions based on at least three audio signals.

Determining a delay maximising the correlation between the at least two audio signals may cause the apparatus to perform: framing the at least two audio signals; time to frequency domain converting the at least two audio signals frame; filtering the at least two audio signal frames in the frequency domain to form sub-bands; cross-correlating for at least two audio signals frame frequency domain sub-band values for a range of delay values; and selecting the delay maximising the cross-correlation product for the at least two audio signals frame frequency domain sub-band values.

Generating a user interface input dependent on the trajectory of the audio source may cause the apparatus to perform at least one of: generating a 'swipe' dependent on the trajectory of the audio source; and generating a 'scroll' dependent on the trajectory of the audio source.

Generating a user interface input dependent on the trajectory of the audio source may cause the apparatus to perform: detecting a status of an apparatus and generating the user interface input further dependent on status of the apparatus.

The apparatus may be caused to perform determining at least one further parameter associated with the audio source and generating a user interface input dependent on the trajectory of the audio source may comprise generating a user interface input further dependent on the at least one further parameter associated with the audio source.

The at least one parameter associated with the audio source may be least one of: tone of the audio source; dominant frequency of the audio source; frequency range of the audio source; duration of the audio source; volume of the audio source; amplitude of the audio source; pitch of the audio source; and total power of the audio source.

Matching the trajectory of the audio source with at least one defined gesture trajectory may cause the apparatus to perform matching a first part of the trajectory of the audio source with a first defined gesture trajectory and matching a second part of the trajectory of the audio source with a second defined gesture trajectory.

The apparatus may comprise at least two microphones, wherein determining at least two audio signals may cause the apparatus to perform capturing at least one of the at least two acoustic signals at a first of the at least two microphones to determine a first of the at least two audio signals and capturing at least a second of the at least two audio signals at a second of the at least two microphones to determine a second of the at least two audio signals.

According to a third aspect there is provided an apparatus comprising: at least one microphone configured to determine at least two audio signals; a signal processor configured to determine a trajectory of an audio source from the at least two audio signals; and a user interface input generator configured to generate a user interface input dependent on the trajectory of the audio source.

The user interface input generator may comprise: a gesture determiner configured to match the trajectory of the audio source with at least one defined gesture trajectory; and a gesture associator configured to generate the user interface input dependent on the at least one defined gesture trajectory.

The gesture determiner may comprise at least one of: a speed matcher configured to detect the speed of the trajectory of the audio source is within a defined gesture speed range; and a direction matcher configured to detect the direction of the trajectory of the audio source is within a defined gesture direction range.

The signal processor may comprise: an audio source position determiner configured to determine an audio source position dependent on the at least two audio signals for a first time and a succeeding second time; and an audio source motion determiner configured to determine the trajectory of the audio source from the difference in audio source position for the first time and the succeeding second time.

The audio source position determiner may comprise a delay determiner configured to determine a delay maximising the correlation between the at least two audio signals.

The motion determiner may comprise at least one of: a line motion determiner configured to determine a trajectory in one dimension based on at least two audio signals; and a shape determiner configured to determine a trajectory in two or three dimensions based on at least three audio signals.

The delay determiner may comprise: a framer configured to frame the at least two audio signals; a time to frequency domain transformer configured to time to frequency domain convert the at least two audio signals frame; a sub-band filter configured to filter the at least two audio signal frames in the frequency domain to form sub-bands; a cross-correlator configured to cross-correlate at least two audio signals frame frequency domain sub-band values for a range of delay values; and a maximum delay determiner configured to select the delay maximising the cross-correlation product for the at least two audio signals frame frequency domain sub-band values.

The gesture associator may comprise at least one of: a swipe gesture associator configured to associate a 'swipe' dependent on the trajectory of the audio source; and a scroll gesture associator configured to associate a 'scroll' dependent on the trajectory of the audio source.

The gesture associator may comprise: a status detector configured to detect a status of the apparatus; and a context modifier configured to generating the user interface input further dependent on status of the apparatus.

The apparatus may comprise a audio source analyser configured to determine at least one further parameter associated with the audio source; and the gesture associator may comprise generating a user interface input further dependent on the at least one further parameter associated with the audio source.

The at least one parameter associated with the audio source may comprise at least one of: tone of the audio source; dominant frequency of the audio source; frequency range of the audio source; duration of the audio source; volume of the audio source; amplitude of the audio source; pitch of the audio source; and total power of the audio source.

The gesture determiner may comprise a first gesture determiner configured to match a first part of the trajectory of the audio source with a first defined gesture trajectory and a second gesture determiner configured to match a second part of the trajectory of the audio source with a second defined gesture trajectory.

The apparatus may comprise at least two microphones, wherein at least one acoustic signal is captured at a first of the at least two microphones to determine a first of the at least two audio signals and at least a second acoustic signal is captured at a second of the at least two microphones to determine a second of the at least two audio signals.

According to a fourth aspect there is provided an apparatus comprising: means for determining at least two audio signals; means for determining a trajectory of an audio source from the at least two audio signals; and means for generating a user interface input dependent on the trajectory of the audio source.

The means for generating a user input dependent on the trajectory of the audio source may comprise: means for matching the trajectory of the audio source with at least one defined gesture trajectory; and means for generating the user interface input dependent on the at least one defined gesture trajectory.

The means for matching the trajectory of the audio source may comprise at least one of: means for detecting the speed of the trajectory of the audio source is within a defined gesture speed range; and means for detecting the direction of the trajectory of the audio source is within a defined gesture direction range.

The means for determining a trajectory of an audio source from the at least two audio signals may comprise: means for determining an audio source position dependent on the at least two audio signals for a first time and a succeeding second time; and means for determining the trajectory of the audio source from the difference in audio source position for the first time and the succeeding second time.

The means for determining an audio source position dependent on the at least two audio signals may comprise means for determining a delay maximising the correlation between the at least two audio signals.

The means for determining a trajectory of an audio source from the at least two audio signals may comprise means for determining a trajectory of an audio source in at least one of: determining a trajectory in one dimension based on at least two audio signals; and determining a trajectory in two or three dimensions based on at least three audio signals.

The means for determining a delay maximising the correlation between the at least two audio signals may comprise: means for framing the at least two audio signals; means for time to frequency domain converting the at least two audio signals frame; means for filtering the at least two audio signal frames in the frequency domain to form sub-bands; means for cross-correlating for at least two audio signals frame frequency domain sub-band values for a range of delay values; and means for selecting the delay maximising the cross-correlation product for the at least two audio signals frame frequency domain sub-band values.

The means for generating a user interface input dependent on the trajectory of the audio source may comprise at least one of: means for generating a 'swipe' dependent on the trajectory of the audio source; and means for generating a 'scroll' dependent on the trajectory of the audio source.

The means for generating a user interface input dependent on the trajectory of the audio source may comprise: means for detecting a status of an apparatus and the means for generating the user interface input being dependent on status of the apparatus.

The apparatus may comprise means for determining at least one further parameter associated with the audio source and the means for generating a user interface input dependent on the trajectory of the audio source may comprise means for generating a user interface input further dependent on the at least one further parameter associated with the audio source.

The at least one parameter associated with the audio source may comprise at least one of: tone of the audio source; dominant frequency of the audio source; frequency range of the audio source; duration of the audio source; volume of the audio source; amplitude of the audio source; pitch of the audio source; and total power of the audio source.

The means for matching the trajectory of the audio source with at least one defined gesture trajectory may comprise means for matching a first part of the trajectory of the audio source with a first defined gesture trajectory and means for matching a second part of the trajectory of the audio source with a second defined gesture trajectory.

The apparatus may comprise at least two microphones, wherein the means for determining at least two audio signals may comprise means for capturing at least one of the at least two audio signals at a first of the at least two microphones and at least a second of the at least two audio signals at a second of the at least two microphones.

A computer program product stored on a medium may cause an apparatus to perform the method as described herein.

An electronic device may comprise apparatus as described herein.

A chipset may comprise apparatus as described herein.

A method for audio user interface input may be substantially as herein described and illustrated in the accompanying drawings.

An apparatus for audio user interface input may be substantially as herein described and illustrated in the accompanying drawings.

Embodiments of the present application aim to address problems associated with the state of the art.

SUMMARY OF THE FIGURES

For better understanding of the present application, reference will now be made by way of example to the accompanying drawings in which.

EMBODIMENTS OF THE APPLICATION

The following describes in further detail suitable apparatus and possible mechanisms for the provision of effective audio signal triggered user interface input.

The concept of the application is related to analysing the trajectory of a moving audio source in the near-field of the device. The analysis of which can form the user input, for example defining whether the trajectory of an audio source can be interpreted as a "swipe" component of the user interface using audio source analysis. More generally where the trajectory of an audio source matches a predefined trajectory then a user interface input can be made to respond in a defined manner.

The trajectories can be customised for such user interface inputs as "swipe", "horizontal scroll" and "vertical scroll" however any suitable trajectory can be mapped to any suitable user interface defined input. The audio source can for example be the user's mouth and the motion obtained by a rotation of the device or the user.

Figure 1:
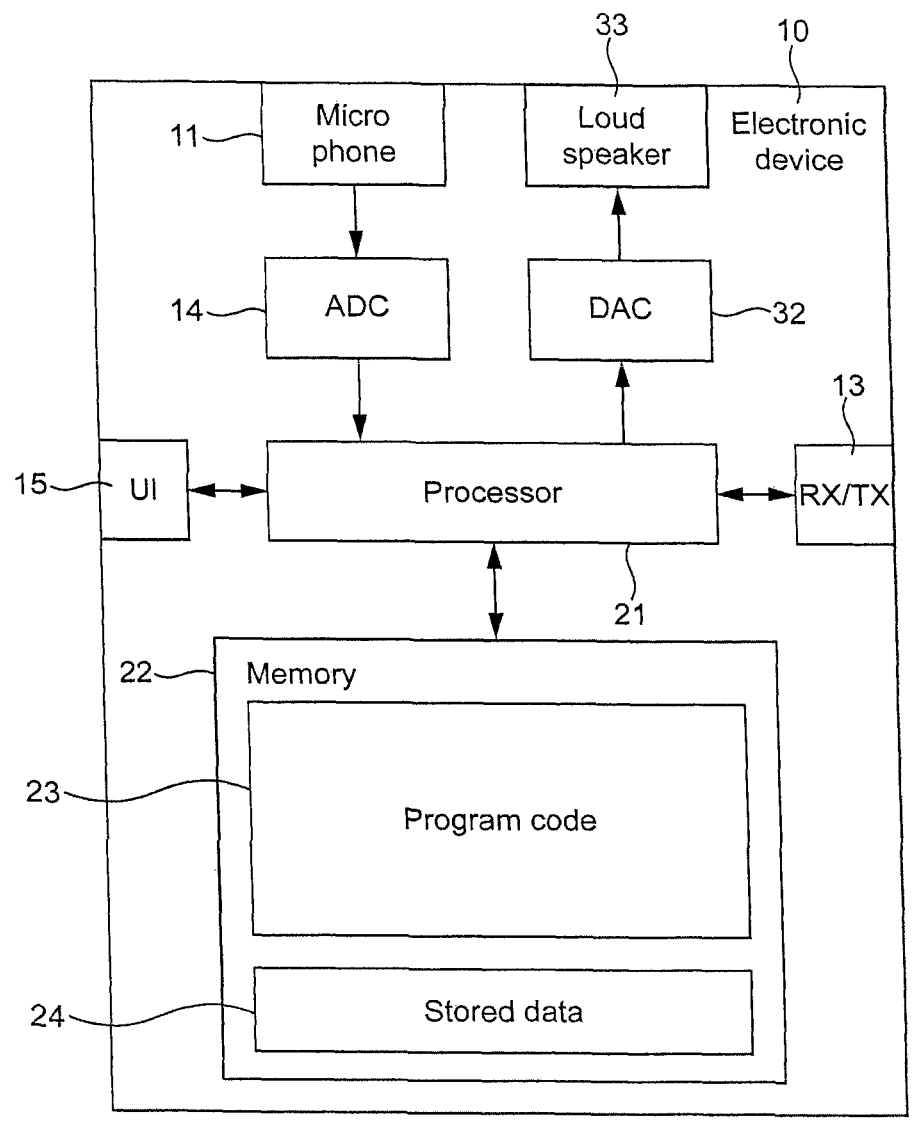
FIG. 1 shows a schematic view of an apparatus suitable for implementing embodiments.

In this regard reference is first made to FIG. 1 which shows a schematic block diagram of an exemplary apparatus or electronic device 10, which may be used to capture or monitor the audio signals, to determine audio source directions/motion and determine whether the audio source motion matches known or determined gestures for user interface purposes.

The apparatus 10 can for example be a mobile terminal or user equipment of a wireless communication system. In some embodiments the apparatus can be an audio player or audio recorder, such as an MP3 player, a media recorder/player (also known as an MP4 player), or any suitable portable device requiring user interface inputs.

In some embodiments the apparatus can be part of a personal computer system enabling hands-free user interface input, for example in an electronic document reader, a tablet computer, a laptop. In some embodiments the apparatus comprises adapted electronic equipment for users with limb injury or with missing limbs.

The apparatus 10 can in some embodiments comprise an audio subsystem. The audio subsystem for example can include in some embodiments a microphone or array of microphones 11 for audio signal capture. In some embodiments the microphone or array of microphones can be a solid state microphone, in other words capable of capturing audio signals and outputting a suitable digital format signal. In some other embodiments the microphone or array of microphones 11 can comprise any suitable microphone or audio capture means, for example a condenser microphone, capacitor microphone, electrostatic microphone, Electret condenser microphone, dynamic microphone, ribbon microphone, carbon microphone, piezoelectric microphone, or microelectrical-mechanical system (MEMS) microphone. The microphone 11 or array of microphones can in some embodiments output the audio captured signal to an analogue-to-digital converter (ADC) 14.

In some embodiments the apparatus and audio subsystem includes an analogue-to-digital converter (ADC) 14 configured to receive the analogue captured audio signal from the microphones and output the audio captured signal in a suitable digital form. The analogue-to-digital converter 14 can be any suitable analogue-to-digital conversion or processing means.

In some embodiments the apparatus 10 and audio subsystem further includes a digital-to-analogue converter 32 for converting digital audio signals from a processor 21 to a suitable analogue format. The digital-to-analogue converter (DAC) or signal processing means 32 can in some embodiments be any suitable DAC technology.

Furthermore the audio subsystem can include in some embodiments a speaker 33. The speaker 33 can in some embodiments receive the output from the digital-to-analogue converter 32 and present the analogue audio signal to the user. In some embodiments the speaker 33 can be representative of a headset, for example a set of headphones, or cordless headphones.

Although the apparatus 10 is shown having both audio capture and audio presentation components, it would be understood that in some embodiments the apparatus 10 can comprise the audio capture only such that in some embodiments of the apparatus the microphone (for audio capture) and the analogue-to-digital converter are present.

In some embodiments the apparatus 10 comprises a processor 21. The processor 21 is coupled to the audio subsystem and specifically in some examples the analogue-to-digital converter 14 for receiving digital signals representing audio signals from the microphone 11, and the digital-to-analogue converter (DAC) 12 configured to output processed digital audio signals.

The processor 21 can be configured to execute various program codes. The implemented program codes can comprise for example source determination, audio source direction estimation, and audio source motion to user interface gesture mapping code routines.

In some embodiments the apparatus further comprises a memory 22. In some embodiments the processor 21 is coupled to memory 22. The memory 22 can be any suitable storage means. In some embodiments the memory 22 comprises a program code section 23 for storing program codes implementable upon the processor 21 such as those code routines described herein. Furthermore in some embodiments the memory 22 can further comprise a stored data section 24 for storing data, for example audio data that has been captured in accordance with the application or audio data to be processed with respect to the embodiments described herein. The implemented program code stored within the program code section 23, and the data stored within the stored data section 24 can be retrieved by the processor 21 whenever needed via a memory-processor coupling.

In some further embodiments the apparatus 10 can comprise a user interface 15. The user interface 15 can be coupled in some embodiments to the processor 21. In some embodiments the processor can control the operation of the user interface and receive inputs from the user interface 15. In some embodiments the user interface 15 can enable a user to input commands to the electronic device or apparatus 10, for example via a keypad, and/or to obtain information from the apparatus 10, for example via a display which is part of the user interface 15. The user interface 15 can in some embodiments comprise a touch screen or touch interface capable of both enabling information to be entered to the apparatus 10 and further displaying information to the user of the apparatus 10.

In some embodiments the apparatus further comprises a transceiver 13, the transceiver in such embodiments can be coupled to the processor and configured to enable a communication with other apparatus or electronic devices, for example via a wireless communications network. The transceiver 13 or any suitable transceiver or transmitter and/or receiver means can in some embodiments be configured to communicate with other electronic devices or apparatus via a wire or wired coupling.

The transceiver 13 can communicate with further devices by any suitable known communications protocol, for example in some embodiments the transceiver 13 or transceiver means can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

In some embodiments the apparatus comprises a position sensor 16 configured to estimate the position of the apparatus 10. The position sensor 16 can in some embodiments be a satellite positioning sensor such as a GPS (Global Positioning System), GLONASS or Galileo receiver.

In some embodiments the positioning sensor can be a cellular ID system or an assisted GPS system.

In some embodiments the apparatus 10 further comprises a direction or orientation sensor. The orientation/direction sensor can in some embodiments be an electronic compass, accelerometer, a gyroscope or be determined by the motion of the apparatus using the positioning estimate.

It is to be understood again that the structure of the electronic device 10 could be supplemented and varied in many ways.

Figure 2:
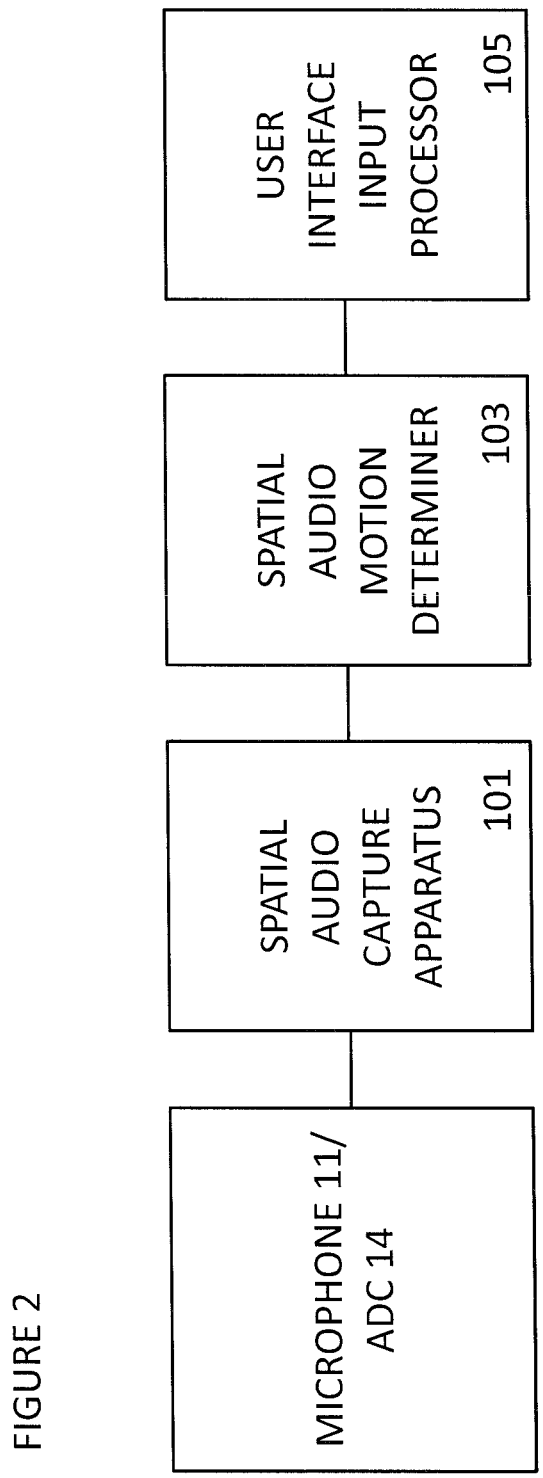
FIG. 2 shows schematically apparatus suitable for implementing embodiments in further detail.

With respect to FIG. 2 the audio source user interface apparatus concept according to some embodiments is shown. Furthermore with respect to FIG. 3 the operation of the apparatus is described.

The apparatus can as described herein comprise a microphone array including at least two microphones or audio capturing means and an associated analogue-to-digital converter suitable for converting the signals from the microphone array at least two microphones into a suitable digital format for further processing. The microphones can be, for example, be located on the apparatus at ends of the apparatus and separated by a distance d. The acoustic signals can therefore be considered to be captured by the microphone and passed by suitable means as an audio signal to a spatial audio capture apparatus 101.

Figure 7:
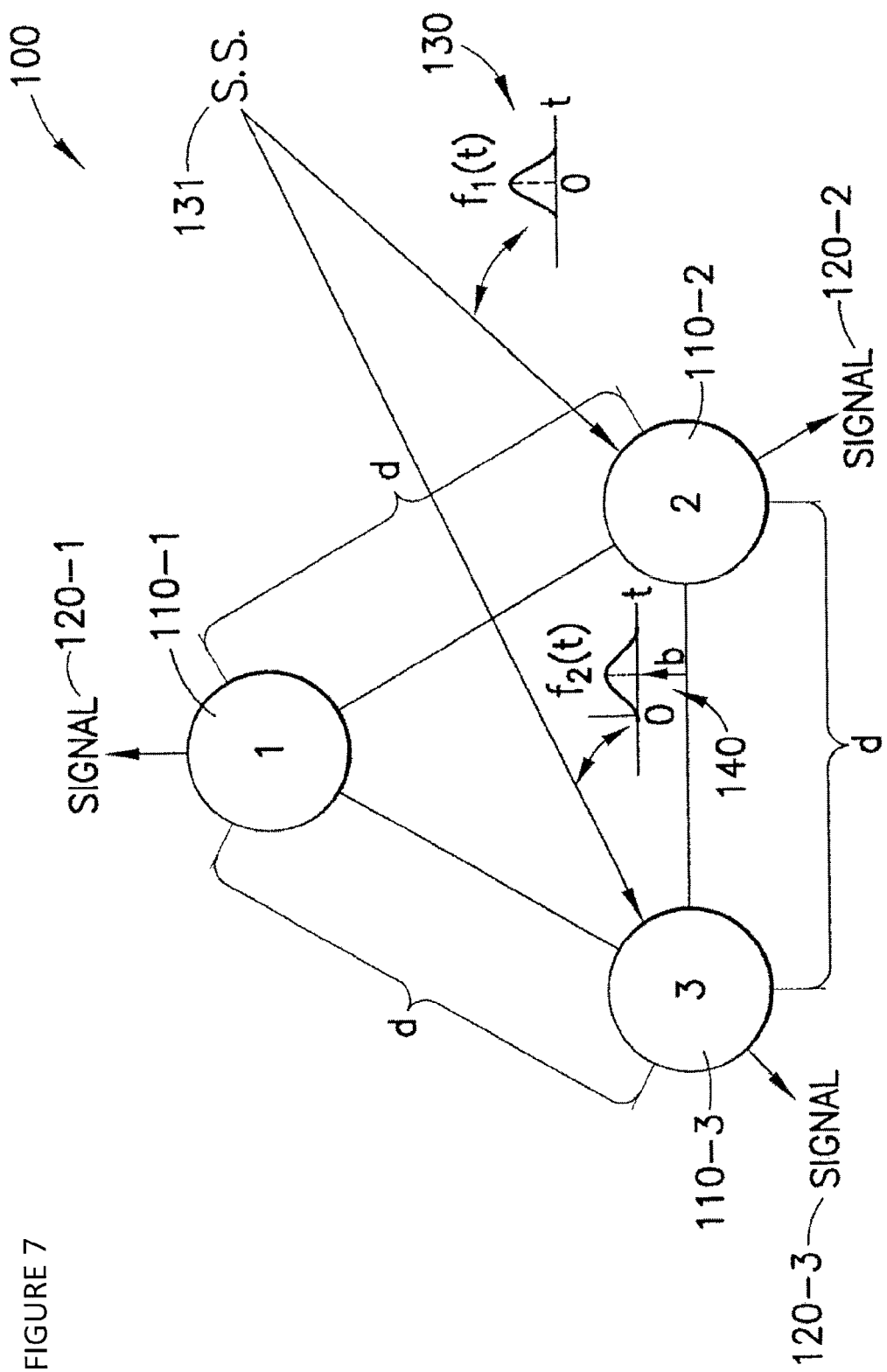
FIG. 7 shows an example microphone arrangement according to some embodiments.

FIG. 7, for example, shows an example microphone array arrangement of a first microphone 110-1, a second microphone 110-2 and a third microphone 110-3 which are in this example arranged at the vertices of an equilateral triangle. In other words each microphone is separated by a dimension or distance d from each other and each pair of microphones can be considered to be orientated at 120° from the other pairs of microphones formed by the array. The separation between each microphone is such that the audio signal received from a signal source 131 will arrive at a first microphone, for example microphone 3 110-2 earlier than at one of the other microphones, such as microphone 2 100-3. This can be seen for example by the time domain audio signal $f_1(t)$ 120-2 130 occurring at the first time instance 0 and the same audio signal $f_2(t)$ 120-3 being received at the third microphone 110-3 delayed with respect to the second microphone signal by a time value of b.

In the following examples a microphone array pair are described. It would be understood that the following microphone array pair examples can be easily scaled up to arrays of microphones with more than two microphones which can in some embodiments include pairs with perpendicular axis to each other to monitor not only an azimuth or elevation but azimuth and elevation, or distinguish between forward and rear audio sources.

Figure 10:
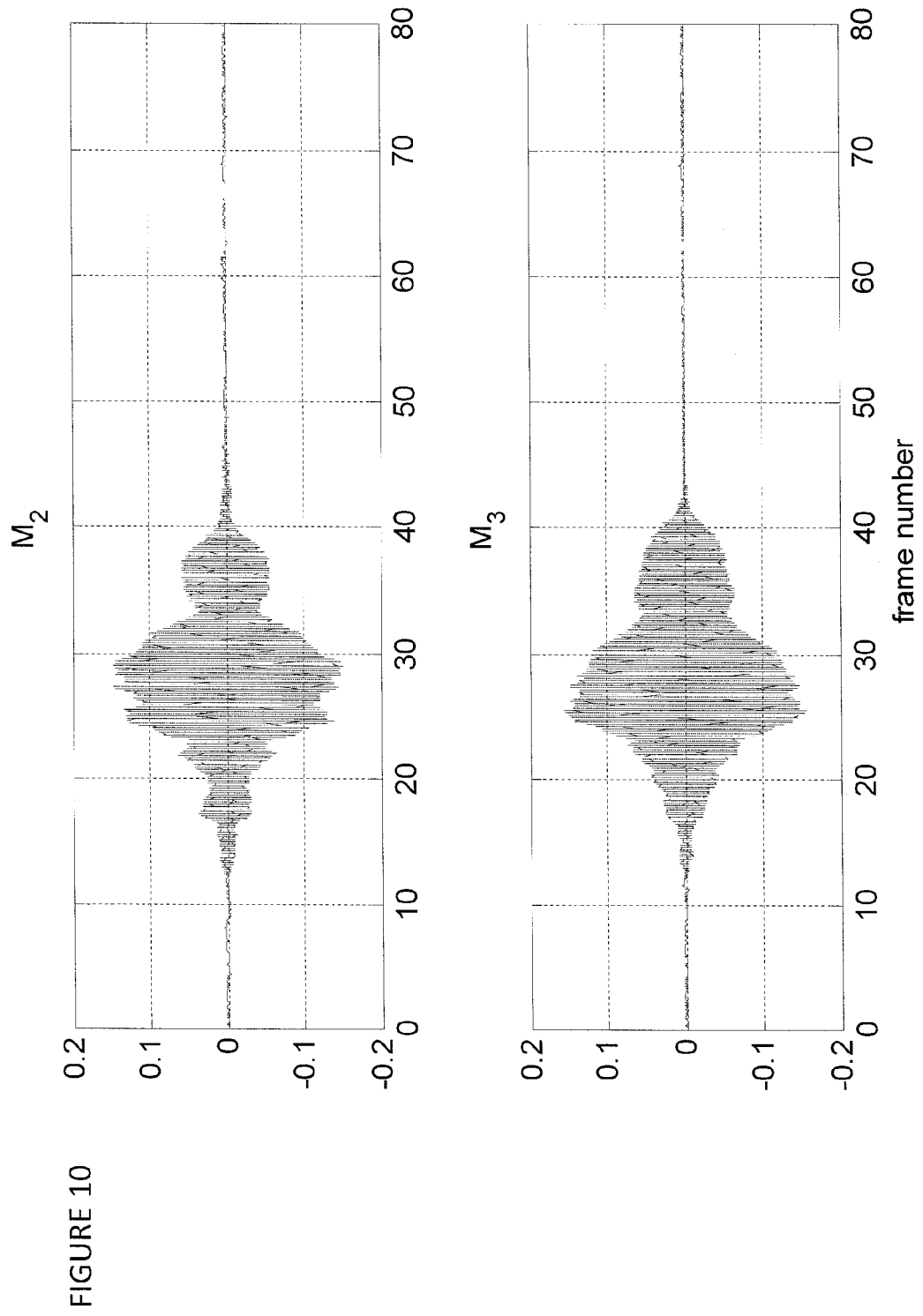
FIG. 10 shows an example audio signal trace for a pair of microphones according to some embodiments.

An example captured audio signals for a first microphone $M_2$ and second microphone $M_3$ are shown in FIG. 10.

Figure 3:
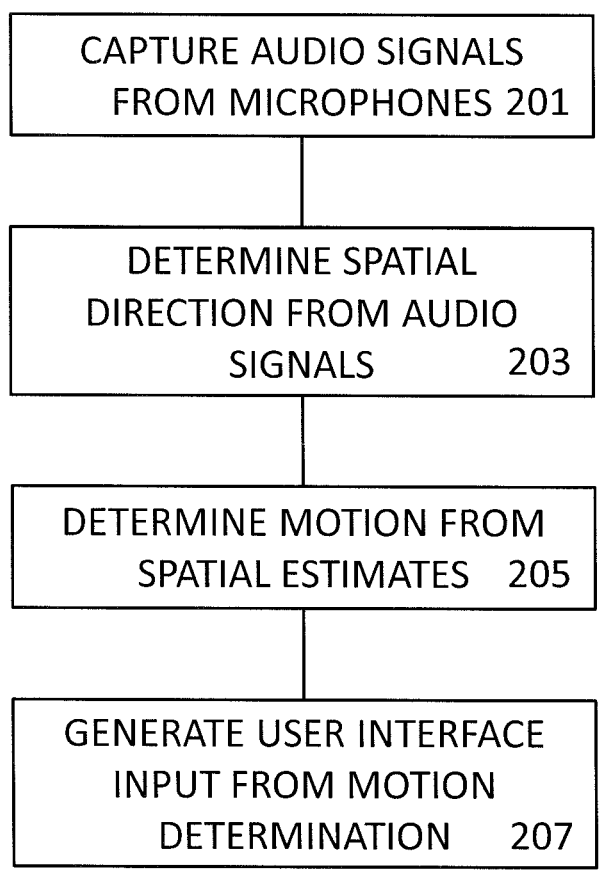
FIG. 3 shows the operation of the apparatus shown in FIG. 2 according to some embodiments.

The operation of capturing audio signals from the microphones is shown in FIG. 3 by step 201.

In some embodiments the apparatus comprises a spatial audio capture apparatus 101. The spatial audio capture apparatus 101 or suitable means can be configured to receive the audio signals from the microphones and perform spatial analysis on these to determine a direction relative to the apparatus of the audio source. The audio source spatial analysis results can then be passed to the spatial audio motion determiner.

The operation of determining the spatial direction from audio signals is shown in FIG. 3 in step 203.

Figure 4:
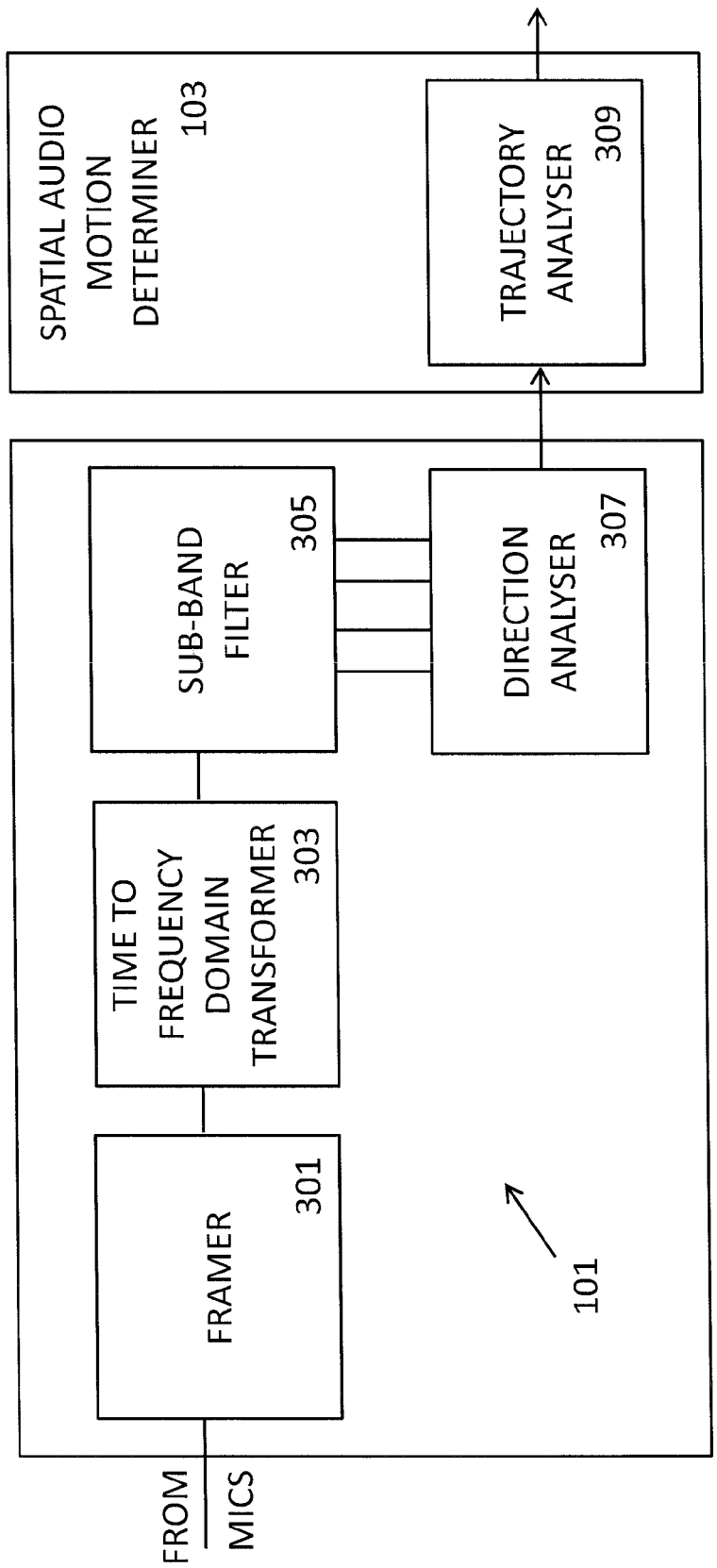
FIG. 4 shows the spatial audio capture apparatus and the spatial audio motion determiner as shown in FIG. 2 in further detail.

With respect to FIG. 4 the spatial audio capture apparatus 101 is shown in further detail. Furthermore with respect to FIG. 5 the operation of the spatial audio capture apparatus 101 shown in FIG. 4 is further described.

In some embodiments the spatial audio capture apparatus 101 comprises a framer 301. The framer 301 or suitable framer means can be configured to receive the audio signals from the microphones and divide the digital format signals into frames or groups of audio sample data. In some embodiments the framer 301 can furthermore be configured to window the data using any suitable windowing function. The framer 301 can be configured to generate frames of audio signal data for each microphone input wherein the length of each frame and a degree of overlap of each frame can be any suitable value. For example in some embodiments each audio frame is 20 milliseconds long and has an overlap of 10 milliseconds between frames. The framer 301 can be configured to output the frame audio data to a Time-to-Frequency Domain Transformer 303.

In some embodiments the spatial audio capture apparatus 101 is configured to comprise a Time-to-Frequency Domain Transformer 303. The Time-to-Frequency Domain Transformer 303 or suitable transformer means can be configured to perform any suitable time-to-frequency domain transformation on the frame audio data. In some embodiments the Time-to-Frequency Domain Transformer can be a Discrete Fourier Transformer (DTF). However the Transformer can be any suitable Transformer such as a Discrete Cosine Transformer (DCT), a Modified Discrete Cosine Transformer (MDCT), a Fast Fourier Transformer (FFT) or a quadrature mirror filter (QMF). The Time-to-Frequency Domain Transformer 303 can be configured to output a frequency domain signal for each microphone input to a sub-band filter 305.

Figure 5:
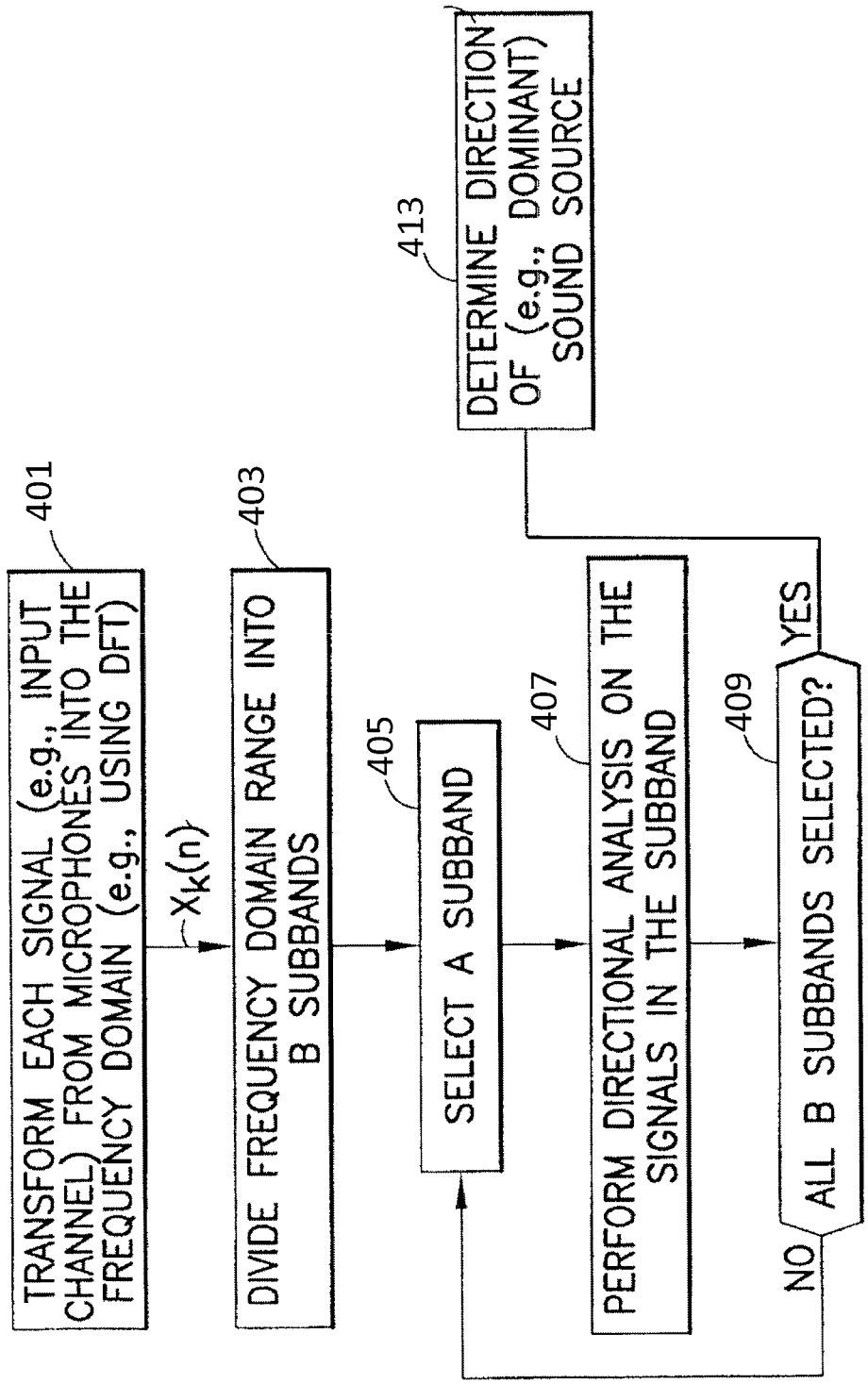
FIG. 5 shows a flow diagram of the operation of the spatial audio capture apparatus according to some embodiments.

The operation of transforming each signal from the microphones into a frequency domain, which can include framing the audio data, is shown in FIG. 5 by step 401.

In some embodiments the spatial audio capture apparatus 101 comprises a sub-band filter 305. The sub-band filter 305 or suitable means can be configured to receive the frequency domain signals from the Time-to-Frequency Domain Transformer 303 for each microphone and divide each microphone audio signal frequency domain signal into a number of sub-bands.

The sub-band division can be any suitable sub-band division. For example in some embodiments the sub-band filter 305 can be configured to operate using psychoacoustic filtering bands. The sub-band filter 305 can then be configured to output each domain range sub-band to a direction analyser 307.

The operation of dividing the frequency domain range into a number of sub-bands for each audio signal is shown in FIG. 5 by step 403.

In some embodiments the spatial audio capture apparatus 101 can comprise a direction analyser 307. The direction analyser 307 or suitable means can in some embodiments be configured to select a sub-band and the associated frequency domain signals for each microphone of the sub-band.

The operation of selecting a sub-band is shown in FIG. 5 by step 405.

The direction analyser 307 can then be configured to perform directional analysis on the signals in the sub-band. The directional analyser 307 can be configured in some embodiments to perform a cross correlation between the microphone pair sub-band frequency domain signals within a suitable processing means.

In the direction analyser 307 the delay value of the cross correlation is found which maximises the cross correlation of the frequency domain sub-band signals. This delay shown in FIG. 7 as time value b can in some embodiments be used to estimate the angle or represent the angle from the dominant audio signal source for the sub-band. This angle can be defined as α. It would be understood that whilst a pair or two microphones can provide a first angle, an improved directional estimate can be produced by using more than two microphones and preferably in some embodiments more than two microphones on two or more axes.

The operation of performing a directional analysis on the signals in the sub-band is shown in FIG. 5 by step 407.

The directional analyser 307 can then be configured to determine whether or not all of the sub-bands have been selected. The operation of determining whether all the sub-bands have been selected is shown in FIG. 5 by step 409.

Where all of the sub-bands have been selected in some embodiments then the direction analyser 307 can compare each of the directional analysis sub-band results to determine at least one dominant sound source. For example in some embodiments the directional analyser 307 can be configured to select the delay representing the direction which occurs in the majority of the sub-band results. In some embodiments the directional analyser 307 can perform grouping analysis on the delays representing the directions for each sub-band to remove outliers which are non-pertinent audio sources and coverage the pertinent directional estimates, in other words selecting the results which are substantially constant between a defined number of sub-bands and ignoring the other sub-bands.

For example where a user whistles to be an audio source at a specific frequency range, that frequency range can be used to select delays from the audio signal input for the sub-bands within the range and with the background signal outside the range ignored or compensated for with regards to directional analysis. In some embodiments the apparatus can be trained or configured to perform the directional analysis on the user's vocal range.

The operation of determining a direction of the dominant sound source based on all of the sub-band data is shown in FIG. 5 by step 413.

Where not all of the sub-bands have been selected then the operation can be passed back to selecting a further sub-band processing step.

The direction analyser 307 can in some embodiments be configured to output a direction value to a spatial audio motion determiner 103.

The above describes a direction analyser performing an analysis using frequency domain correlation values. However it would be understood that the spatial audio capture apparatus can perform directional analysis using any suitable method. For example in some embodiments the spatial audio capture apparatus can be configured to output specific azimuth-elevation values rather than maximum correlation delay values. Furthermore in some embodiments the spatial analysis can be performed in the time domain.

In some embodiments the apparatus comprises a spatial audio motion determiner 103 or audio source motion determining means. The spatial audio motion determiner 103 is configured to receive direction analysis values over a series of frames to determine a trajectory or motion of the sound source.

With regards to FIG. 4, the spatial audio motion determiner 103 is shown in further detail. Furthermore with respect to FIG. 6 the operation of the spatial audio motion determiner 103 is shown. The spatial audio motion determiner 103 can in some embodiments comprise a trajectory analyser 309 configured to determine the trajectory of the detected audio signal source.

The trajectory analyser 309 can therefore in some embodiments be configured to receive the delay values which generate the maximum cross-correlation values for each microphone pair.

Figure 6:
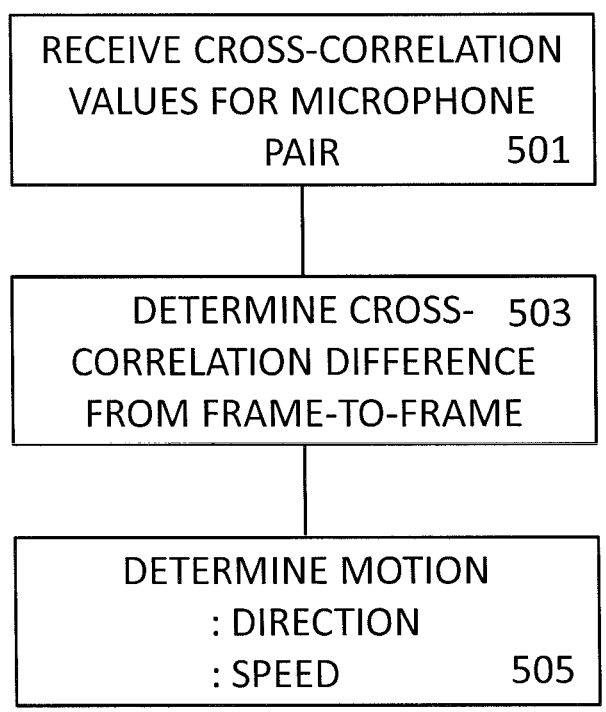
FIG. 6 shows a flow diagram of the operation of the spatial audio motion determiner in further detail according to some embodiments.

The operation of receiving the delay values which generate the maximum cross-correlation values for each microphone pair is shown in FIG. 6 by step 501.

The trajectory analyser 309 can then be configured to determine trajectories or motion by the differences in the delay values from frame-to-frame.

The operation of determining the delay value differences from frame-to-frame is shown in FIG. 6 by step 503.

From the delay value differences the trajectory analyser 309 can in some embodiments be configured to therefore determine the motion of the audio source. In some embodiments the trajectory analyser 309 can be configured to define or categorize the motion of the audio source with respect to a direction value and further in some embodiments with respect to a speed of motion value.

The operation of determining the motion direction and speed is shown in FIG. 6 by step 505.

Figure 11:
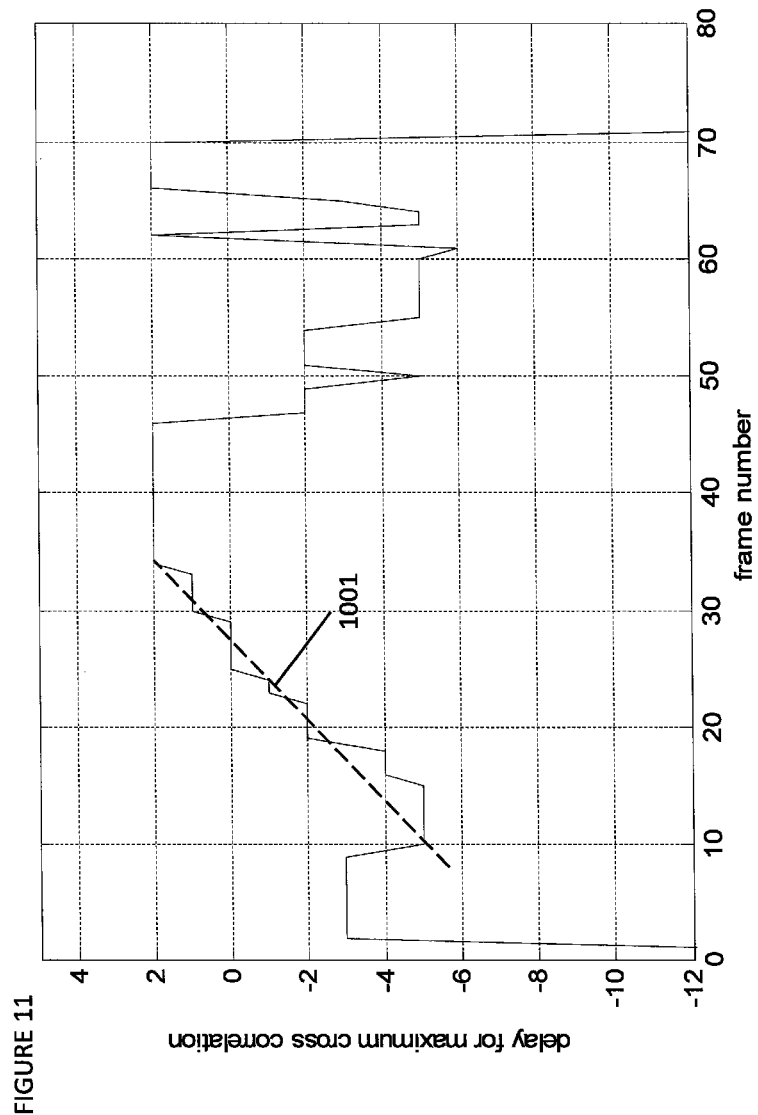
FIG. 11 shows an example moving cross-correlation trace which indicates motion of an audio source according to some embodiments.
Figure 12:
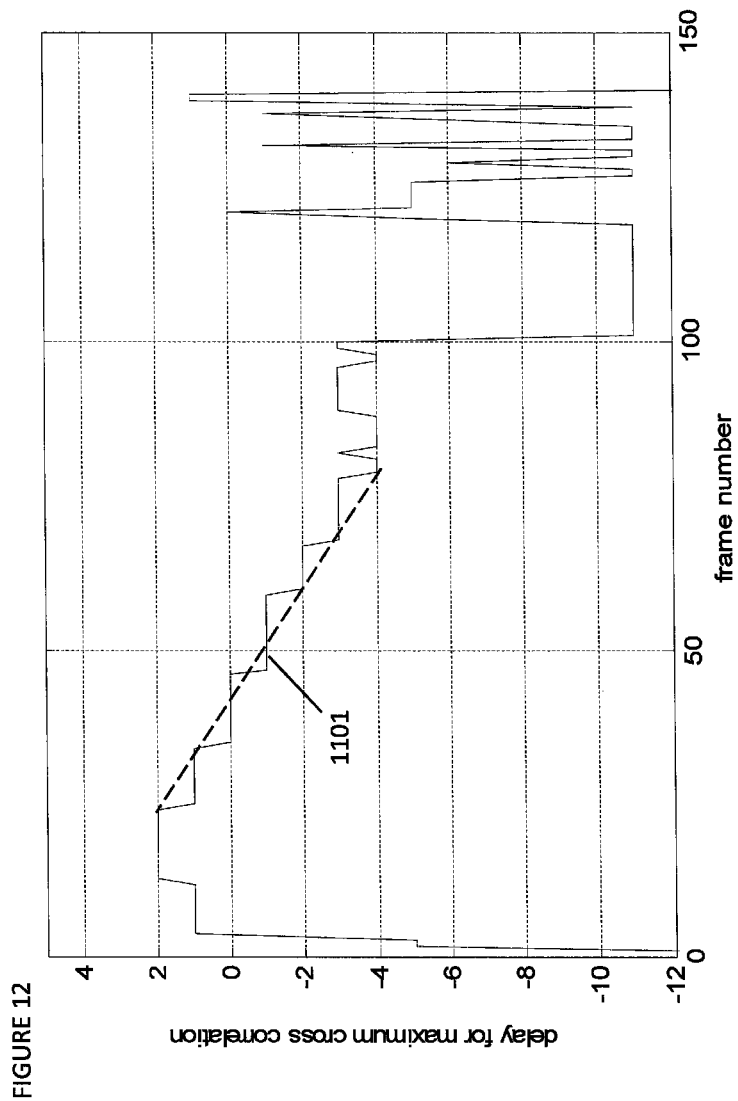
FIG. 12 shows a further example of a moving cross-correlation trace indicating motion of an audio source according to some embodiments.

With respect to FIGS. 11 and 12 motion of the audio source is shown with respect to the cross correlation delay value increasing 1001 in FIG. 11 and therefore indicating motion from the left to the right and decreasing 1101 in FIG. 12 showing motion from the right to the left of the pair.

The operation of determining the motion from spatial estimates is shown in FIG. 3 by step 205.

In some embodiments the apparatus comprises a user interface input processor 105 or suitable gesture determination and user interface input association means. The user interface input processor 105 can be configured to receive from the spatial audio motion determiner 103 estimated motion vectors comprising the direction and speed of the audio source and from this determine whether or not a user input has been made.

In some embodiments the user interface input processor 105 is configured to monitor the direction and the speed of the motion and trigger a user interface input when a determined gesture has been detected. The direction and speed of the motion can be considered to determine a trajectory or path of the audio sound source. In some embodiments the determination or detection of the gesture is where the trajectory or path of the audio sound source matches within boundaries a defined or learnt gesture trajectory or path.

For example the gesture trajectory can be a simple linear motion speed threshold, and when the user interface input processor determines when the audio signal source speed in a defined direction is greater than or equal to the threshold generates a user interface input. For example a 'swipe' user interface input can be associated with a gesture trajectory defined as the sound source moving in the azimuth direction within a defined speed region. Similarly a 'vertical scroll' user interface input can in some embodiments be associated with a gesture trajectory defined by the sound source moving in an elevation direction within a defined 'scrolling' speed region and a 'horizontal scroll' user interface input associated with a gesture trajectory defined by the sound source moving in an azimuth direction within the defined 'scrolling' speed region.

It would be understood that any suitable combination of trajectory shape or speed could be used as a user interface trigger.

Furthermore the user interface input processor or suitable gesture association means can in some embodiments be configured to associate a gesture trajectory to more than one user interface input and select the user interface input based on the apparatus status or any other suitable selection input. For example a clockwise circling trajectory could be associated with an "increase volume" user interface input when the apparatus is playing back an audio track, whereas the clockwise circling trajectory could be associated with a "list scroll" user interface input when the apparatus is displaying a list of audio tracks to be played back.

It would be understood, as shown herein, that the gesture trajectory can be an audio source trajectory moving in azimuth and/or elevation and//or range from the apparatus. In other words gestures can be 1 dimensional—linear, 2 dimensional—flat or 3 dimensional—with depth. In such embodiments the gesture can be defined for example by an azimuth, elevation and distance from the apparatus.

In some embodiments the gesture can be a complex gesture or compound gesture where simple or single gestures combined can have a more complex user interface input range. An example of a simple gesture is as described herein detecting a motion of audio source when the motion of the audio source is sufficiently fast as it moves in the azimuth which can be detected by the user interface input processor to provide a 'swipe' user interface input, or a clockwise circling trajectory could be associated with an "increase volume" user interface input. However in some embodiments the user interface input processor can be configured when detecting the first trajectory and then the second trajectory in sequence to generate a third and different user interface input. For example an azimuth motion followed by clockwise circling trajectory can when detected cause the user interface to generate a 'home' user interface input returning the device to the 'home screen'.

In some embodiments the user interface input processor can be configured to 'shadow' the audio gesture onto the display of the apparatus to enable the user to perform the gesture trajectory. For example in some embodiments the position or motion of the audio sound source is displayed on the apparatus display in real time to permit the user to follow the input.

The user interface input processor can perform the matching operation between the audio source position/motion and the gesture trajectories according to any suitable manner. The user input processor can in some embodiments include any suitable pattern matching or pattern recognition means.

Although in the embodiments shown herein the primary gesture component is the position or motion of the audio source generating the audio signals captured by the apparatus it would be understood that in some embodiments other parameters associated with the audio signals and source could be used to further assist the generation of user interface inputs. For example in some embodiments a parameter associated with the audio signal such as at least one of the tone, volume or length of the audio signal could be used as an additional gesture parameter to be matched by the user interface input processor before generating the user input.

Figure 8:
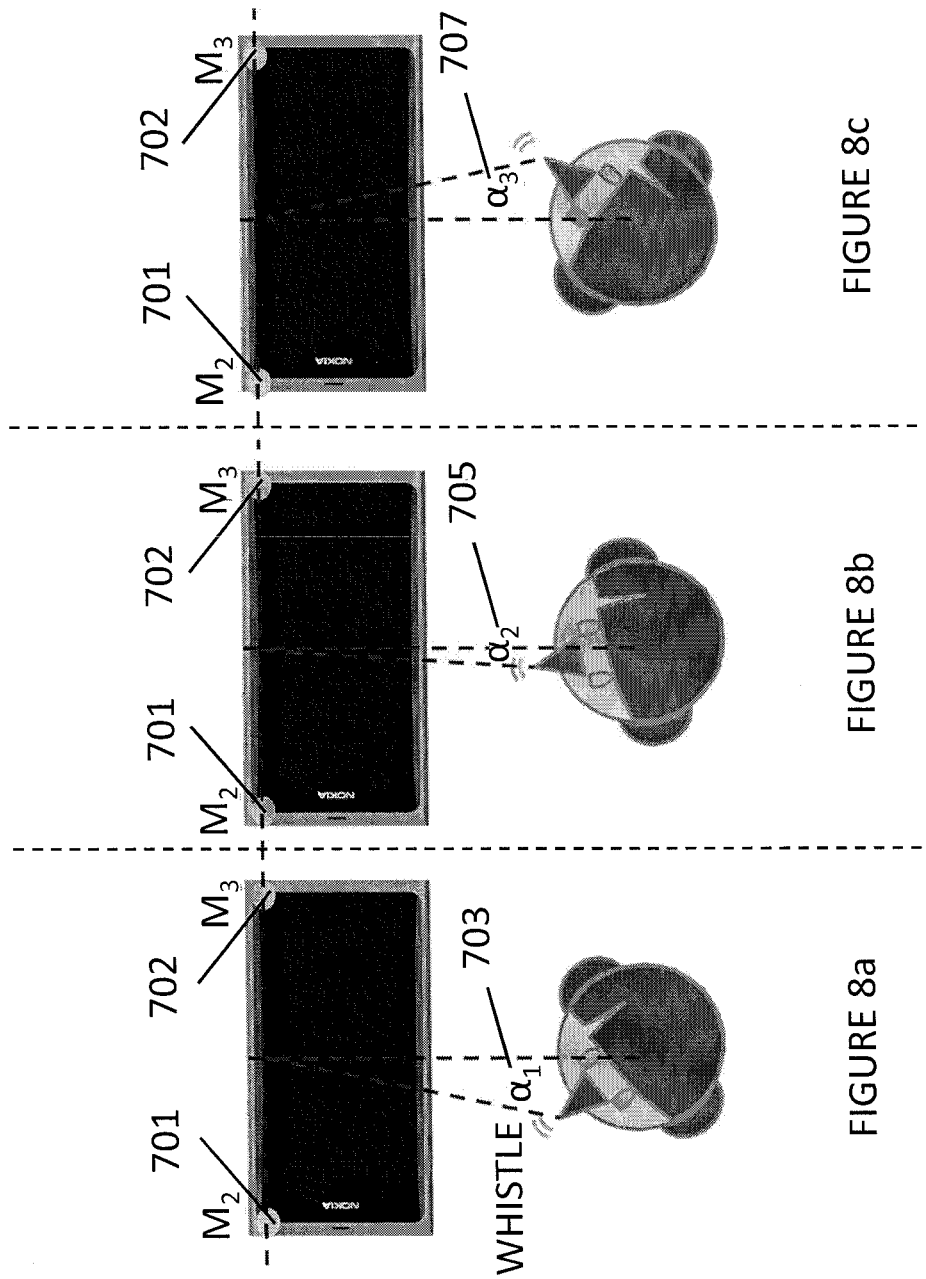
FIGS. 8a, 8b and 8c show an example audio source motion detectable by embodiments and suitable for use as a user interface input according to some embodiments.

With respect to FIGS. 8*a*, 8*b* and 8*c*, an example audio source generated user input "swipe" gesture is shown. With respect to FIG. 8*a*, the apparatus 10 is shown with a first microphone M2 701 and a second microphone M3 702 located at either end of the apparatus. The user, for example, is offset from the reference line perpendicular to and halfway between the two microphones such that the audio source the user's mouth, defines a first angle $\alpha_1$ 703 with respect to the reference line. With reference to FIGS. 8*b* and 8*c*, the angle change as the user performs a "swipe" using the user's mouth as an audio source is shown. The swipe is triggered as the apparatus determines the motion of the user's mouth moving from left to right and thus with respect to FIG. 8*b* the angle $\alpha_2$ 705 is much closer to the reference direction and the angle with respect to FIG. 8*c* at a later time is increased and to the right of the reference line defining an angle $\alpha_3$ 707.

Other gestures can for example be used to trigger "scroll" user interface operations.

Figure 9:
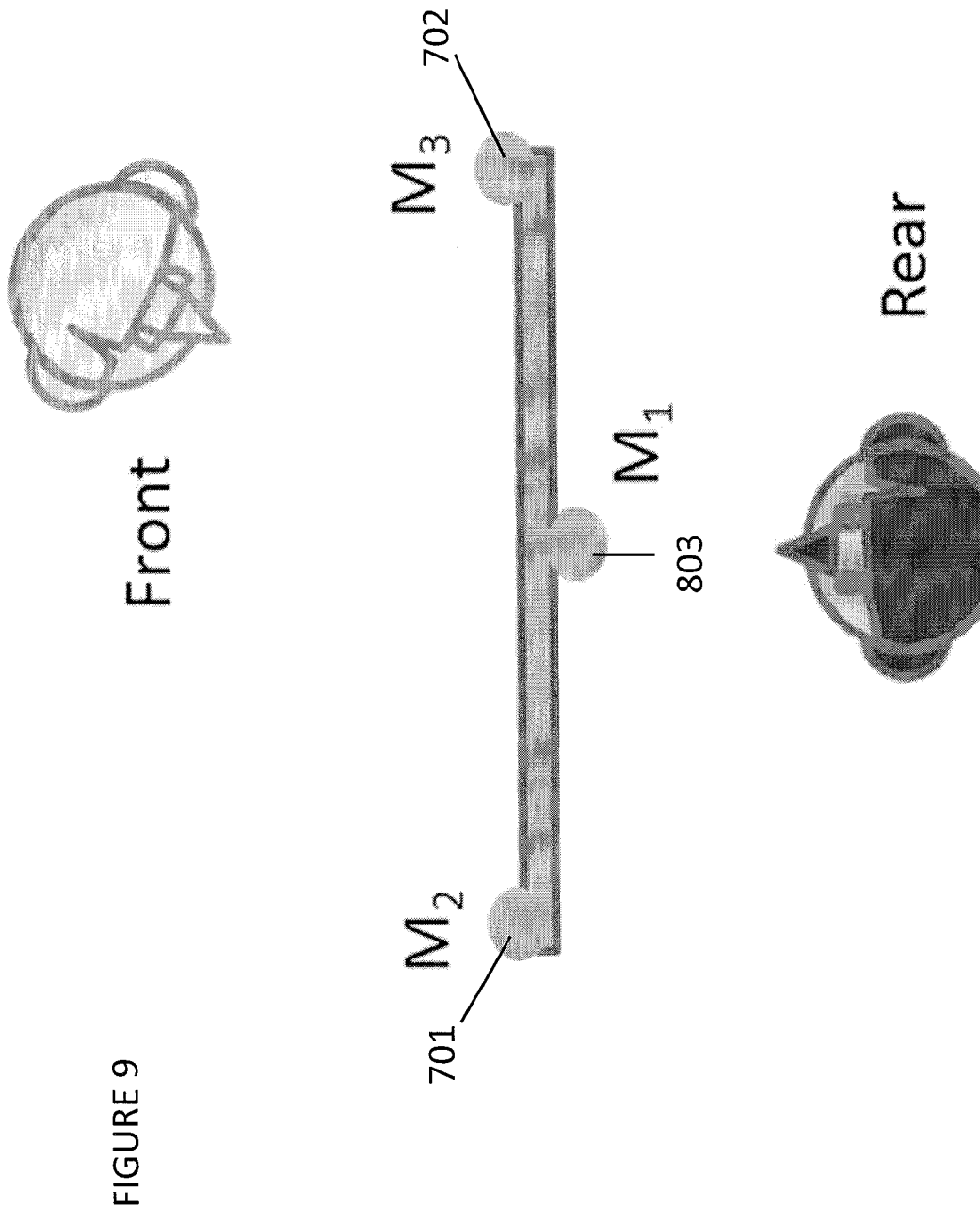
FIG. 9 shows a three microphone arrangement suitable for determining audio source directions from the front and back of the apparatus according to some embodiments.

As shown and described previously, two microphones by themselves are not able to determine whether the audio source is to the front or rear of the apparatus. With reference to FIG. 9 an example apparatus implementation according to some embodiments is shown wherein a first microphone M2 702 and second microphone M3 702 are located towards the front of the apparatus and a third microphone M1 803 is located to the rear. In such embodiments there will be a unique set of delays between each pair of microphones which can be mapped to provide source directions along the azimuth.

It would be understood that in order to determine source elevation, the microphones would be required to be offset from each other on the Z-axis as well as the "X-Y" plane shown in FIG. 9.

In the description herein the components can be considered to be implementable in some embodiments at least partially as code or routines operating within at least one processor and stored in at least one memory.

It shall be appreciated that the term user equipment is intended to cover any suitable type of wireless user equipment, such as mobile telephones, portable data processing devices or portable web browsers.

Furthermore elements of a public land mobile network (PLMN) may also comprise apparatus as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising:
   determining at least two audio signals from a sound generated by a moving audio source;
   determining a trajectory of the moving audio source from the at least two audio signals; and
   generating a user interface input dependent on the trajectory of the moving audio source, wherein generating the user interface input dependent on the trajectory of the moving audio source comprises:
   comparing the determined trajectory of the moving audio source with at least one defined gesture trajectory; and
   generating the user interface input when the determined trajectory matches with the at least one defined gesture trajectory.

2. The method as claimed in claim 1, wherein the matching the trajectory of the moving audio source comprises at least one of: detecting the speed of the trajectory of the moving audio source is within a defined gesture speed range; and
   detecting the direction of the trajectory of the moving audio source is within a defined gesture direction range.

3. The method as claimed in claim 1, wherein determining the trajectory of the moving audio source from the at least two audio signals comprises:
   determining an audio source position dependent on the at least two audio signals for a first time corresponding to a first position of the moving audio source and a succeeding second time corresponding to a second position of the moving audio source; and
   determining the trajectory of the moving audio source from the difference in audio source position for the first time and the succeeding second time.

4. The method as claimed in claim 3, wherein determining the audio source position dependent on the at least two audio signals comprises determining a delay maximising the correlation between the at least two audio signals.

5. The method as claimed in claim 1, wherein determining the trajectory of the moving audio source from the at least two audio signals at least one of:
   determining a trajectory in one dimension based on at least two audio signals; and
   determining a trajectory in two or three dimensions based on at least three audio signals.

6. An apparatus comprising at least one processor and at least one memory including computer code for one or more programs, the at least one memory and the computer code configured to with the at least one processor cause the apparatus at least to:
   determine at least two audio signals from a sound generated by a moving audio source:
   determine a trajectory of the moving an audio source from the at least two audio signals; and
   generate a user interface input dependent on the trajectory of the moving audio source;
   wherein causing the apparatus to generate the user interface input dependent on the trajectory of the moving audio source causes the apparatus to:
   compare the determined trajectory of the moving audio source with at least one defined gesture trajectory; and
   generate the user interface input when the determined trajectory matches with the at least one defined gesture trajectory.

7. The apparatus as claimed in claim 6, wherein causing the apparatus to determine the trajectory of the moving audio source from the at least two audio signals causes the apparatus to:

determine an audio source position dependent on the at least two audio signals for a first time corresponding to a first position of the moving audio source and a succeeding second time corresponding to a second position of the moving audio source; and determine the trajectory of the moving audio source from the difference in audio source position for the first time and the succeeding second time.

8. The apparatus as claimed in claim 6, wherein causing the apparatus to determine the trajectory of the moving audio source from the at least two audio signals causes the apparatus to at least one of:

determine a trajectory in one dimension based on at least two audio signals; and determine a trajectory in two or three dimensions based on at least three audio signals.

9. The apparatus as claimed in claim 6, wherein causing the apparatus to generate the user input dependent on the trajectory of the moving audio source causes the apparatus to at least one of: generate a 'swipe' dependent on the trajectory of the moving audio source; and generate a 'scroll' dependent on the trajectory of the moving audio source.

10. The apparatus as claimed in claim 6, wherein the apparatus is configured to determine at least one of:

a speed of the trajectory of the moving audio source is within a defined gesture speed range; and a direction of the trajectory of the moving audio source is within a defined gesture direction range.

11. The apparatus as claimed in claim 6, wherein the apparatus is caused to determine the at least two audio signals configured to capture at least one acoustic signal by a first microphone to determine a first of the at least two audio signals and capture at least one acoustic signal by a second microphone to determine a second of the at least two audio signals.

12. The apparatus as claimed in claim 11, wherein the apparatus is caused to analyse the audio signals from the microphones so as to determine a direction of the trajectory of the moving audio source.

13. A computer program product embodied in a non-transitory computer memory and comprising instructions the execution of which by a processor results in performing operations that comprise:

determining at least two audio signals from a sound generated by a moving audio source;

determining a trajectory of the moving an audio source from the at least two audio signals; and generating a user interface input dependent on the trajectory of the moving audio source; wherein generating the user interface input dependent on the trajectory of the moving audio source comprises:

comparing the determined trajectory of the moving audio source with at least one defined gesture trajectory; and generating the user interface input when the determined trajectory matches with the at least one defined gesture trajectory.

14. The computer product as claimed in claim 13, wherein the matching the trajectory of the moving audio source comprises at least one of:

detecting the speed of the trajectory of the moving audio source is within a defined gesture speed range; and detecting the direction of the trajectory of the moving audio source is within a defined gesture direction range.

15. The computer product as claimed in claim 13, wherein determining the trajectory of the moving audio source from the at least two audio signals comprises:

determining an audio source position dependent on the at least two audio signals for a first time and a succeeding second time; and determining the trajectory of the moving audio source from the difference in audio source position for the first time and the succeeding second time.

16. The computer product as claimed in claim 15, wherein determining the audio source position dependent on the at least two audio signals comprises determining a delay maximising the correlation between the at least two audio signals.

17. The computer product as claimed in claim 13, wherein determining the trajectory of the moving audio source from the at least two audio signals at least one of:

determining a trajectory in one dimension based on at least two audio signals; and determining a trajectory in two or three dimensions based on at least three audio signals.

* * * * *